P. W. MONTGOMERY.
MAGNETIC WATER LEVEL INDICATOR FOR STEAM BOILERS.
APPLICATION FILED JULY 26, 1912.
1,128,812.
Patented Feb. 16, 1915.
2 SHEETS—SHEET 1.
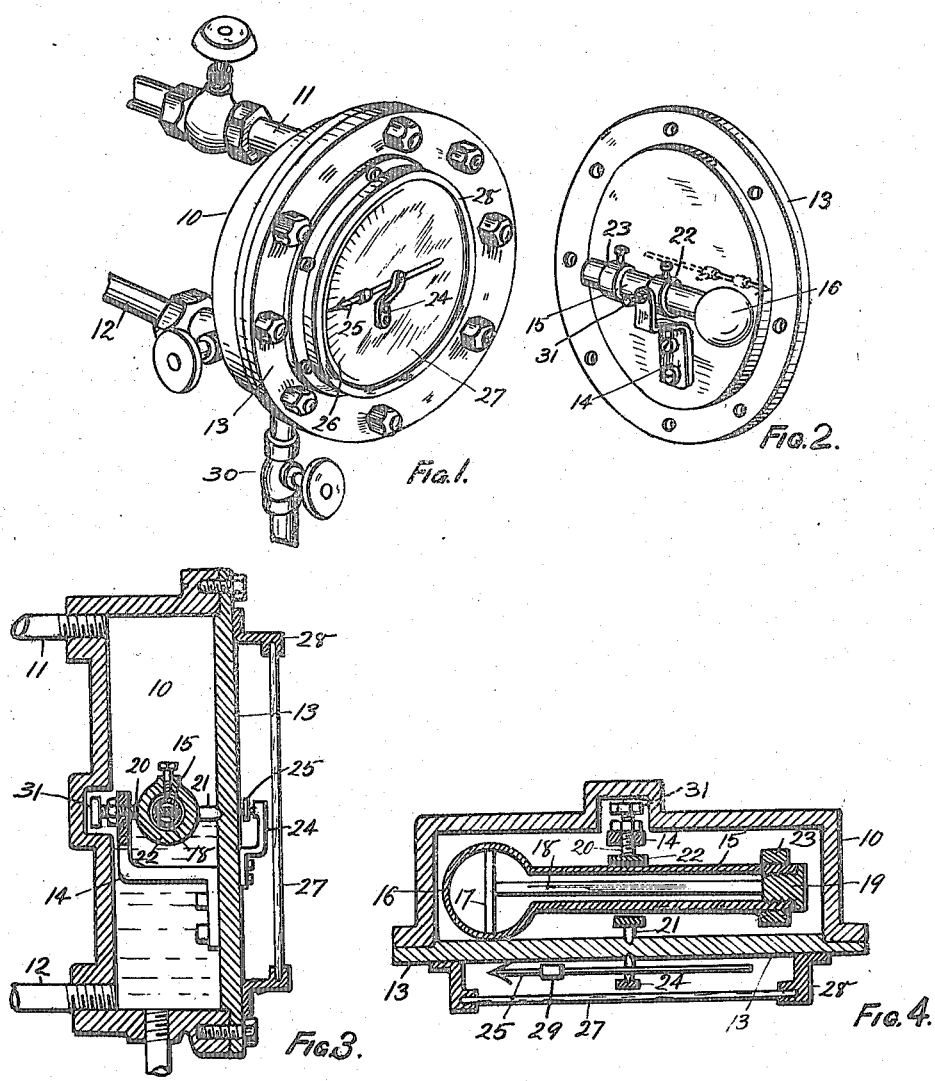
Witnesses.
Inventor.
P. W. Montgomery.

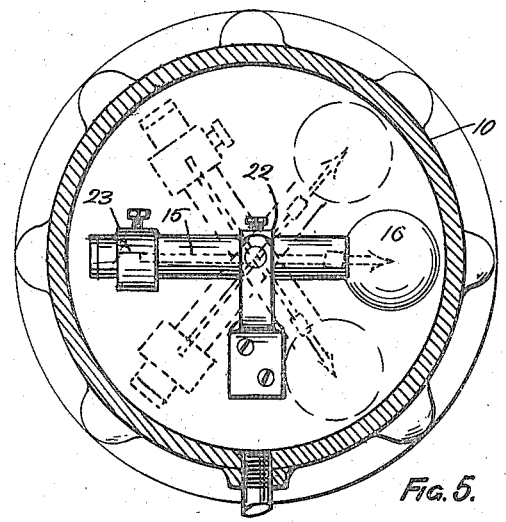
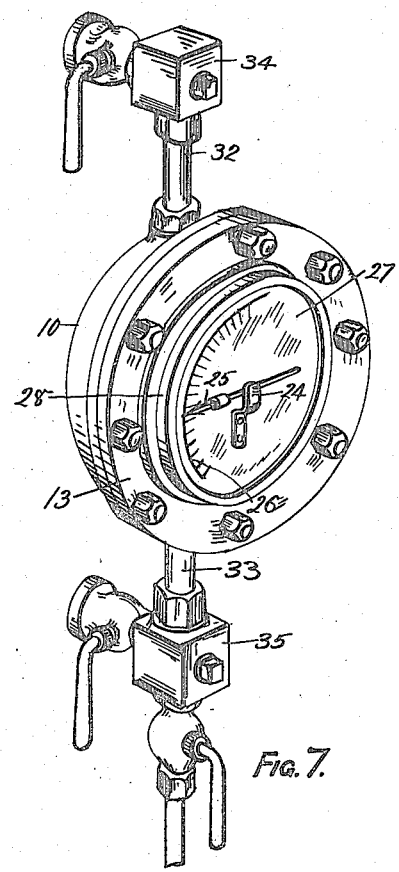
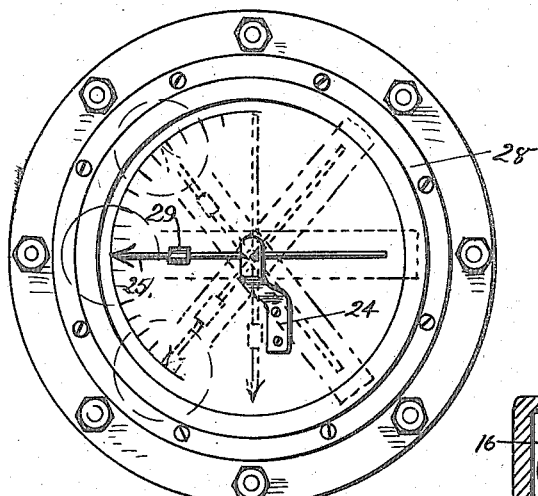
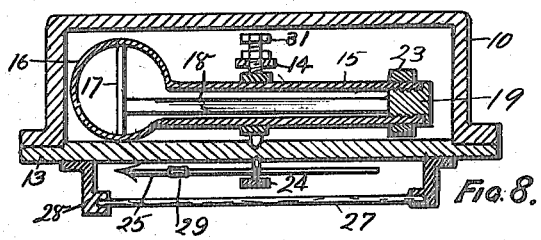

UNITED STATES PATENT OFFICE.

PERCY WILLIAM MONTGOMERY, OF SYDNEY, NEW SOUTH WALES, AUSTRALIA.

MAGNETIC WATER-LEVEL INDICATOR FOR STEAM-BOILERS.

1,128,812.     Specification of Letters Patent.     Patented Feb. 16, 1915.

Application filed July 26, 1912. Serial No. 711,710.

*To all whom it may concern:*

Be it known that I, PERCY WILLIAM MONTGOMERY, a subject of the King of Great Britain and Ireland, residing at "Porchester," Hathern street, Leichhardt, Sydney, in the State of New South Wales, Commonwealth of Australia, have invented certain new and useful Improvements in Magnetic Water-Level Indicators for Steam-Boilers, of which the following is a specification.

The object of this invention is to obviate the use of the glass tubes commonly used in connection with steam boilers (communicating at their upper and lower ends respectively with the steam and water spaces within the boiler) to indicate visually the level of the surface of the water therein, and to provide an indicator in which no material of a brittle nature is subjected to pressure of water or steam.

It is well known that the usual glass tubes are liable to fracture under sudden changes of temperature or from other causes, with frequently disastrous results, but in my invention I provide a casing (communicating at its upper and lower portions respectively with the steam and water spaces of the boiler) which owing to the fact that it is unnecessary that the mechanism therein should be visible, may be made entirely of metal preferably of a non-oxidizable and non-magnetic nature.

The arrangement of the steam and water connections may be varied to suit circumstances or existing fittings such as ordinary gage-glass mountings, by the provision of suitable ferrules.

The two natural forces which I utilize in effecting my invention are flotation and magnetism, the former being employed to support on the surface of the water within the said casing (or float chamber) a hollow float attached to one end of a float-arm composed of non-oxidizable and non-magnetic material pivoted approximately about its middle within the casing and carrying a permanent bar-magnet so positioned longitudinally that its neutral axis is in line with the pivotal axis of the carrying arm and one end is in line with the center of the said float. The other end of the said arm is provided with an adjustable counter-poise so that the balance of the arm and float may be regulated, it being essential for the proper working of the invention that the immersion of the float should be such that its center is level with the surface of the water. The magnetic force of the bar-magnet is employed to operate or control synchronously with the movement of the float-arm, a magnetized needle or pointer mounted on the outside of the face of the casing upon a pivot in line with that of the float arm, and having its neutral axis coincident with its pivot.

The disposition of the magnet within the float-arm as regards the location of its poles is immaterial but on the principle that like poles repel and unlike poles attact the disposition of the pointer is such that its positive and negative poles are juxtaposed respectively to the negative and positive poles of the magnet, so that oscillation of the latter by the rise or fall of the float, synchronously oscillates the pointer, the end of the latter juxtaposed to the float indicating the level of the water within the chamber and consequently within the boiler.

The apparatus when in use is positioned so that the normal or proper working level of the water is indicated by the pointer when in the horizontal position, any variation of level being indicated by upward or downward inclination thereof, the amount of such inclination being ascertained by the position of the pointer and by reference to a graduated dial in front of which the pointer moves.

I will now further describe my invention with reference to the accompanying drawings in which:—

Figure 1 is a front perspective view of the apparatus. Fig. 2 is a perspective view of the back of the removable cover of the casing showing the internal parts. Fig. 3 is a sectional elevation of the apparatus. Fig. 4 is a sectional plan thereof. Fig. 5 is an interior view showing the normal position of the float-arm in full lines and inclined positions in dotted lines, the corresponding positions of the pointer being also shown in dotted lines. Fig. 6 is an external face view similarly showing the normal position and inclined position of the pointer and of the float arm. Fig. 7 illustrates the method of fitting the invention to ordinary gage-glass mountings, and Fig. 8 shows a modification of the arrangement of the float and float arm whereby the latter with the magnet is brought closer to the pointer.

The casing or float-chamber 10 is in communication with the steam and water spaces of the boiler by means of connections 11 and 12 respectively and is provided with a removable cover 13 carrying on its inner face a bracket 14. The non-corrosive and non-magnetic float-arm 15 has at one end the float 16 having a central stop-plate 17 against which one end of the bar magnet 18 contacts, the other end of the said arm being fitted with the water-tight plug 19 which bears against the other end of the magnet and prevents longitudinal movement of the latter, which is made a neat sliding fit in the said arm or is packed therein so that its alinement with the center line of the same is assured. The float-arm is supported by pivots 20 and 21 projecting horizontally on opposite sides from the ring member 22, the former bearing in a socket in the adjusting set pin 31 of the bracket 14 and the latter in a socket in the cover 13 as shown in Fig. 4. Adjustment and regulation of the balance of the float-arm and float is effected by means of the adjustable counterpoise 23 for the purpose before stated.

On the outside of the removable cover 13 is fitted a bracket 24 between which and the said cover is pivotally mounted the magnetized needle or pointer 25, its indicating end terminating in line with the center of the float, for obviously if it were not so it would give a false reading when the float arm is in an inclined position. The cover 13 has attached to it or inscribed upon it a dial having graduated markings 26. For the protection of the pointer an outer cover 27 of transparent material such as glass or mica is provided, secured in a ring flange 28 attached to the cover 13.

It is to be noted that it is necessary that the float arm should have a slight over-balance toward the float end to insure the latter following the surface of the water as the level of the latter falls, but in the event of the rise or fall being abnormal the arm is prevented from assuming the vertical and possibly inoperative position by contacting with the bracket 14 as shown by the dotted lines in Fig. 5. On the other hand in the event of failure of the magnetic force to control the pointer this fact is made evident by the pointer assuming a truly vertical position. This is effected by providing a slight over-balance (weight 29) at the indicating end. The bracket 24 as shown in Fig. 6 is so constructed as to permit of the vertical position being assumed by the pointer. A test cock 30 is provided in the casing for the purpose of testing the operativeness of the apparatus.

The bar magnet and the pointer may be made of steel, nickel, cobalt or other suitable magnetizable metal, and the casing and cover may if considered desirable have their inner surfaces amalgamated with mercury to prevent corrosion.

In Fig. 7 illustrating the method of fitting the invention to ordinary gage-glass mountings, the steam and water connections consist of ferrules 32 and 33 attached respectively to the top and bottom of the casing and adapted for insertion in the mountings 34 and 35 similarly to the ends of an ordinary gage-glass.

In Fig. 8 it will be noted that the float arm 15 instead of being disposed centrally with the float 16, is attached more to the side of the latter toward the removable cover 13, thereby bringing the magnet 18 nearer to the pointer 25 so that the magnetic force of the latter is more effective, and space is economized.

What I claim is:—

In a water level indicator for steam boilers, a steam and water tight casing having steam and water connections to the boiler, a tubular arm pivotally supported within said casing intermediate of its length and having one end thereof enlarged and forming a float, said tube being suitably sealed at the other end, a counter-poise adjustably arranged on one end of said tube, a bar magnet inclosed within said tube and protected from corrosion, a magnetized pointer pivotally secured to the outer face of the said casing in alinement with the pivotal axis of said tubular arm and adapted to follow the movement of the bar magnet through its magnetic influence, and a suitable casing inclosing said indicator pointer.

In testimony whereof I affix my signature in presence of two witnesses.

PERCY WILLIAM MONTGOMERY.

Witnesses:
Wm. Newton,
Chas. Hatton.